United States Patent [19]

Morgan

[11] Patent Number: 4,524,354

[45] Date of Patent: Jun. 18, 1985

[54] APPARATUS AND METHOD FOR MONITORING REMOTE SECURITY ZONES

[76] Inventor: Jack B. Morgan, 1657 Parkhills Ave., Los Altos, Calif. 94022

[21] Appl. No.: 376,455

[22] Filed: May 10, 1982

[51] Int. Cl.³ ........................ H04Q 9/00; G08B 29/00

[52] U.S. Cl. ............................... 340/825.36; 340/502; 340/525; 340/825.1

[58] Field of Search ....................... 340/825.32, 825.36, 340/825.1, 502, 505, 506, 518, 541, 525

[56] References Cited

U.S. PATENT DOCUMENTS

| | | | |
|---|---|---|---|
| 3,958,240 | 5/1976 | Richardson, III | 340/525 |
| 4,023,139 | 5/1977 | Samburg | 340/506 |
| 4,067,008 | 1/1978 | Sprowls, III | 340/825.1 |
| 4,117,479 | 9/1979 | Galvin et al. | 340/502 |
| 4,339,746 | 7/1982 | Ulicki et al. | 340/518 |

*Primary Examiner*—Donald J. Yusko

*Attorney, Agent, or Firm*—Townsend and Townsend

[57] ABSTRACT

Apparatus and a method for detecting the actuation of any of a plurality of security sensors at respective zones remotely spaced from a central control location and for displaying information representing the operating status of a zone whose sensor has been actuated. The apparatus comprises a control unit having a central processor and an input coupled to a transponder bus to which a plurality of remote transponders are connected, each transponder having a number of security sensors associated therewith. The control unit further includes a visual display having a first portion for displaying sequentially the identifying numbers assigned to the remote zones and a second portion for displaying the operating status of a zone whose identifying number is shown on the first portion of visual display. When a sensor is actuated at one of the zones, the central processor of the control unit causes the identifying number of the zone and the status of the zone to be displayed simultaneously. The control unit also displays information as to whether the sensor actuation at the zone is continuous or of short duration. By actuation of a status switch on the control unit, an operator can acknowledge a change in the status of the zone and return the display to its initial status condition before or after taking steps to correct any action which caused the status change at the zone. The control unit can also display information which indicates a power failure, a line problem, or a tampering of the equipment.

7 Claims, 4 Drawing Figures

APPARATUS AND METHOD FOR MONITORING REMOTE SECURITY ZONES

This invention relates to improvements in the monitoring of remote locations by security devices and, more particularly, to apparatus and method for monitoring a plurality of remote security zones spaced from a central control location and for displaying the status of such zones in a sequential fashion.

BACKGROUND OF THE INVENTION

Remote zones have been monitored for security purposes in the past by placing sensors at the zones and having communication lines extending from the sensors to a central control location. Changes in the operating conditions of the sensors can be detected by the actuation of visual or sound indicators at the central control location. However, systems of conventional design for carrying out these purposes have been complex in construction and costly to manufacture and operate. For this reason, a need has arisen for improvements in monitoring systems for a plurality of remote zones which give information about status changes of remote zones and permit the monitoring of the zones without requiring special skills and without the need for complex circuitry.

SUMMARY OF THE INVENTION

The present invention satisfies the aforesaid need by providing an improved apparatus and method for monitoring the operating status of a plurality of remote security zones spaced from a central control location. The apparatus includes a control unit having a central processor which receives signals on a transponder bus from a plurality of transponders. Each transponder has a number of input sensors at respective, remote security zones for automatic actuation when changes at the zones occur. The central processor, when it receives a signal from a remote sensor, actuates a visual display and a sonic alert indicator to provide an indication of a change in the operating status of the zone and the operating status of the sensor at the zone. The operator of the system can take immediate action after becoming aware of such changes to meet any challenge presented by the changes after obtaining the information displayed by the control unit.

The information displayed by the control unit can be changed by the manipulation of a status switch on the control unit. In this way, a single actuation switch on the control unit can cause the processor to display not only the status of a zone whose status has changed, but also cause the processor to display the operating status of the sensor at the zone as to whether the sensor actuation is continuous or of short duration. The processor can also permit any one of the zones to be accessed, i.e., to permit entry to the zone, without causing an alarm event to occur at the zone.

The present invention provides a monitor system which is simple and rugged in construction, is inexpensive to manufacture, install and maintain, and is capable of being used by individuals with no special skills. The system is also useful for a large number of remote security zones so that the cost of operating the system per zone is minimal.

The primary object of the present invention is to provide an apparatus and method for monitoring remote security zones spaced from a central control location wherein any change in the status of a zone will be sensed and indicated immediately on a display at the central control location whereupon an operator of the system can take remedial action as required when a change occurs and, to signify such action, can actuate a single status switch at the central control location which will cause the display to indicate whether the change at the remote zone is continuous or of short duration, yet the displayed status of the zone can be returned to its initial state, all to the end that the system is simple to operate and is economical to produce and maintain.

Other objects of this invention will become apparent as the following specification progresses, reference being had to the accompanying drawings for an illustration of the invention.

Figure 1:
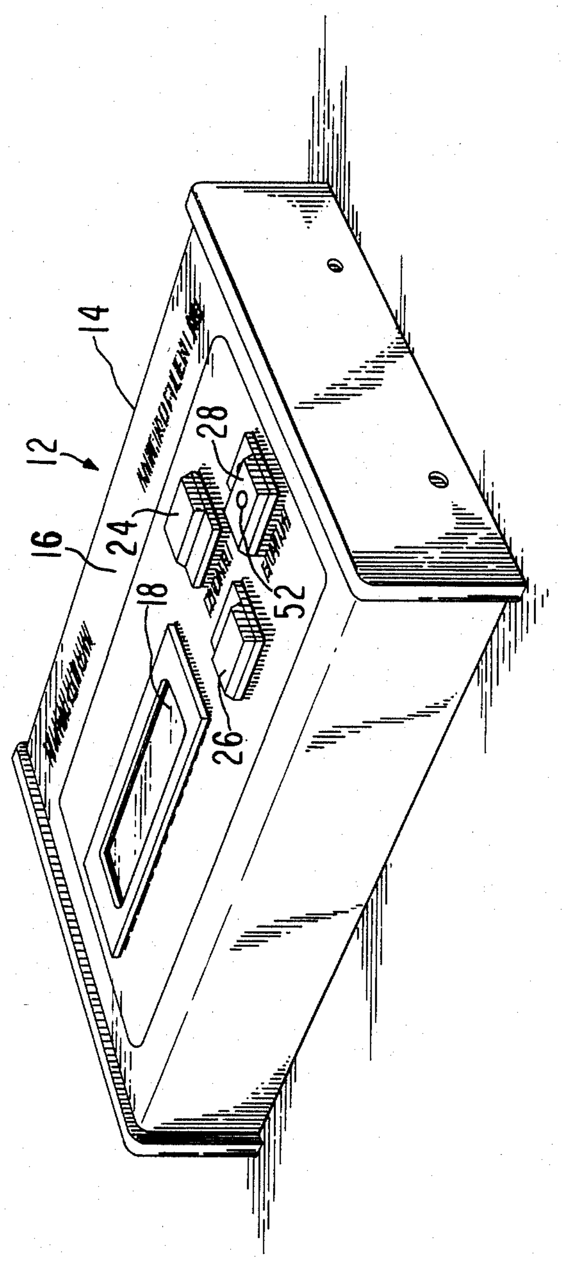
FIG. 1 is a perspective view of a central control unit for the security system of the present invention.

The present invention comprises a multiplex monitor and display system and is broadly denoted by the numeral 10. System 10 is adapted to provide status information relating to a plurality of remote, spaced security zones to be monitored, such as various locations throughout a warehouse or large plant. The system comprises a control unit 12 shown in FIGS. 1-3, the control unit adapted to be placed at a central location and including a housing 14 provided with a front panel 16. A liquid crystal display 18 is mounted on panel 16 adjacent to three push button control switches 19, 20 and 22 (FIG. 3) having respective pushbuttons 24, 26 and 28 (FIG. 1) projecting outwardly from front panel 16. The control unit is comprised of a number of components, including a central processor 36, as shown in FIG. 3 which will hereinafter be described.

Figure 2:
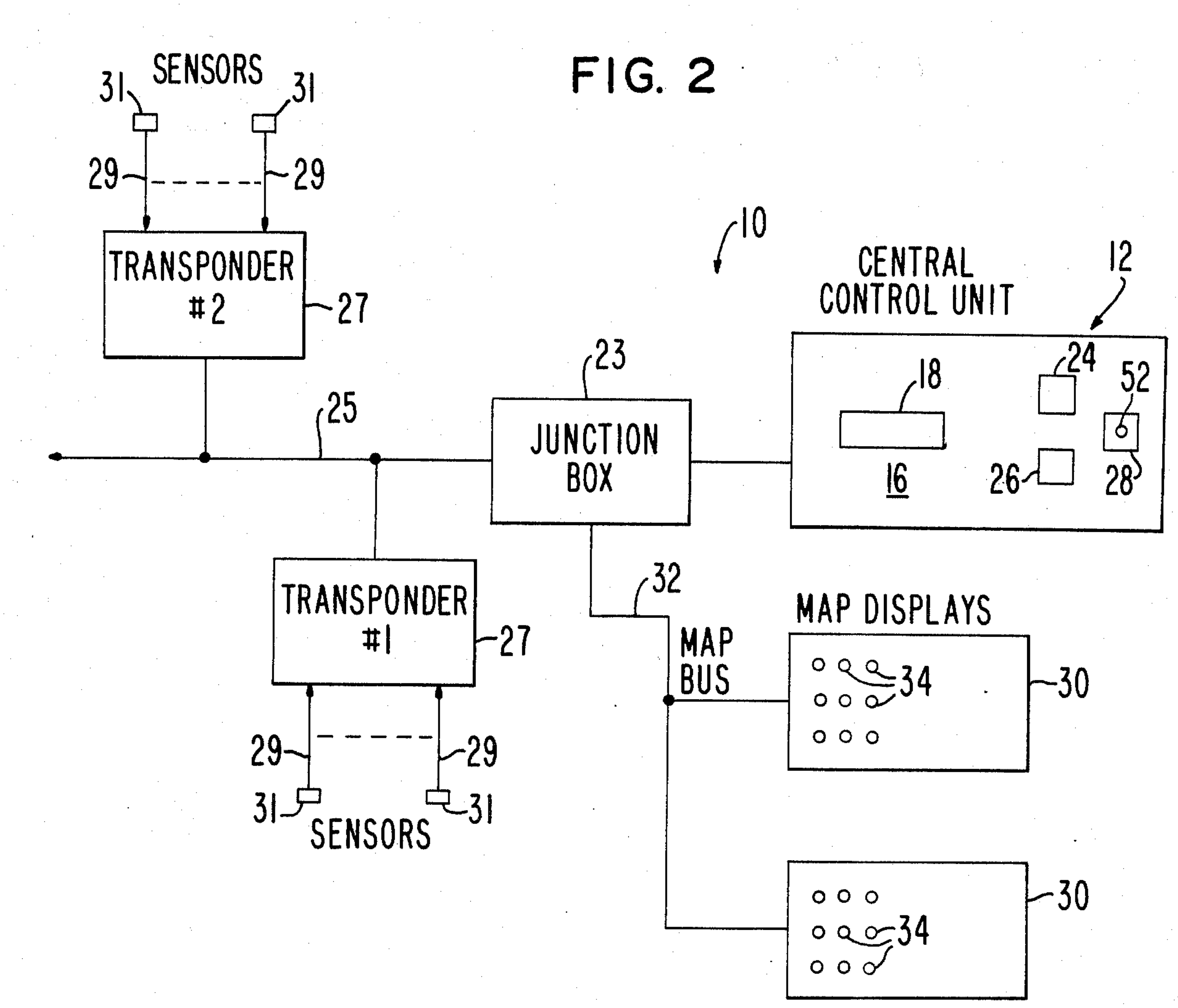
FIG. 2 is a block diagram of the central control unit in combination with a number of sensors at remote zones spaced from the central control unit and map displays near the control unit for simultaneously indicating the status of the sensors at the remote locations.

FIG. 2 shows control unit 12 coupled by a junction box 23 and a transponder bus 25 with a plurality of transponders 27, each transponder having a number of inputs 29 from sensors 31 at remote zones to be monitored by system 10. As an optional feature, system 10 can be provided with map displays 30, coupled by a map bus 32, to junction box 23 so that a visual display, such as displays formed by LED's 34, can be formed which represent the status of zones 31 whose sensors are coupled by leads 28 to the inputs of respective transponders 27. Thus, there is an optional map display 30 for each transponder 27, respectively, if desired.

Figure 3:
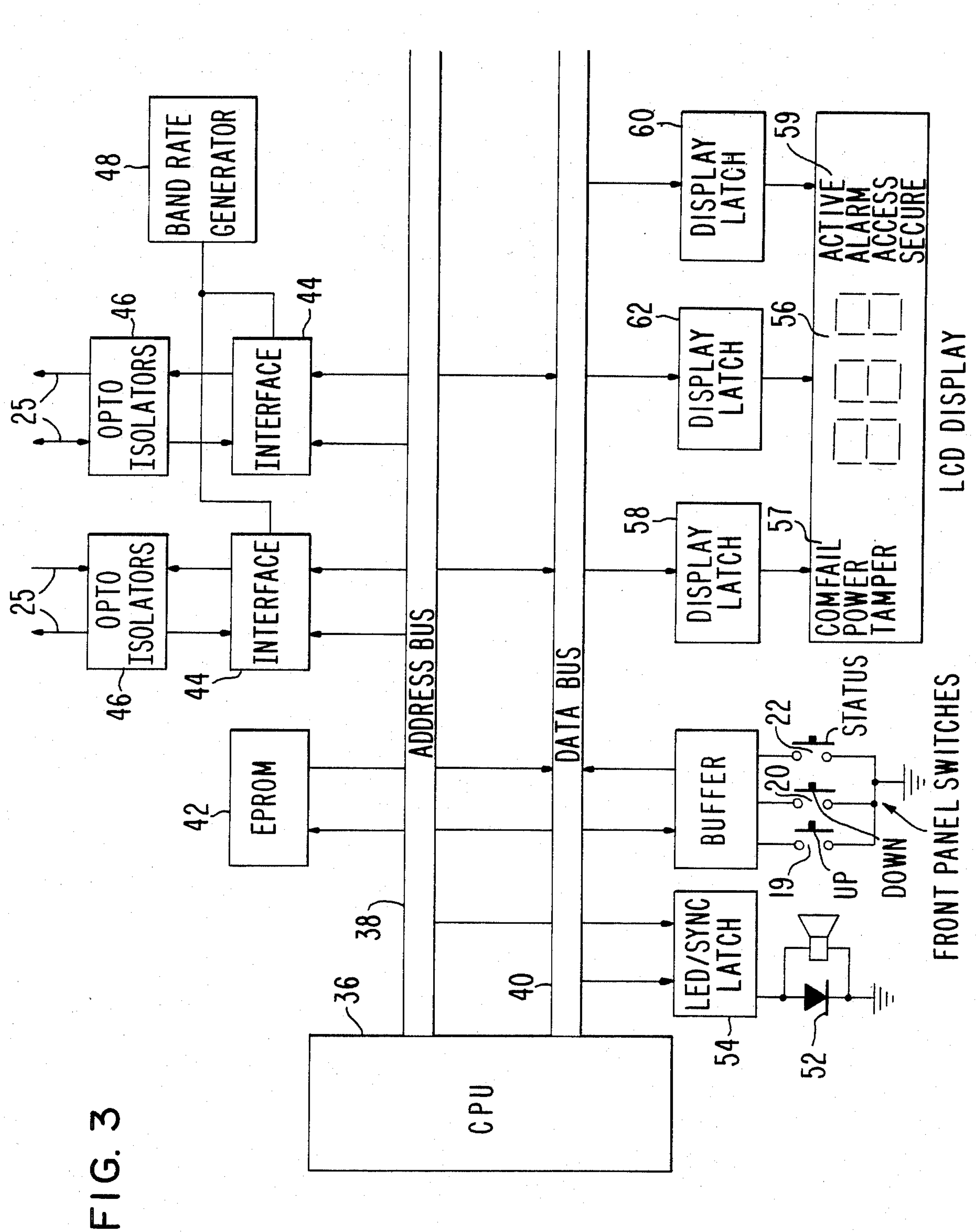
FIG. 3 is a block diagram of the components of the central control unit.

Control unit 12 is shown in more detail in FIG. 3 and includes central processing unit 36, such as a 6802 CPU having an internal ram of 128 bytes. An address bus 38 and a data bus 40 extend outwardly from the CPU and are coupled to other components of control unit 12. Address bus 38 is coupled to an EPROM 42 which stores a program for operating system 10. A number of interface units 44 are coupled to address bus 38 and data bus 40 and receive data from sensors 31 at respective, remote zones through opto-isolator units 46. The leads coupled with units 46 form parts of transponder bus 25. A baud rate generator 48 is coupled with interface units 44 to control the receipt of data directed thereto from opto-isolator units 46.

Data bus 40 is coupled with switches 19, 20 and 22 through a buffer 50. Switch 22 has an LED 52 coupled with its push-button 28 (FIGS. 1 and 2) and this LED is coupled through an LED/sync latch 54 to address bus 38 and data bus 40. A sonic alert indicator 55 also is coupled to data bus 40 through latch 54.

FIG. 3 also shows liquid crystal display 18 on the front panel 16 of housing 14. The liquid crystal display, can display three 7-segment numerical digits in a central portion 56 of the display and can display seven different words. Three words can be displayed in a portion 57 to the left of central portion 56, and four words can be displayed in portion 59 to the right of central portion 56. These seven words are comfail, tamper, power, active, alarm, access and secure. Display latches 58, 60 and 62 are coupled with the word portions 57 and 59 and central portion 56, respectively. Display latches 58 are coupled also to data bus 40.

Control switches 19 and 20 (FIG. 3) sequence the display of the identifying numbers assigned to various remote zones 31 up and down and cause changes in the numerals displayed by the digits in central portion 56 of display 18. Switch 22 defines a system status switch which is actuated to change the status of a zone whose identifying number is displayed on display 18.

Immediately upon the application of power to system 10, control unit 12, under the control of central processor 36, scans bus 25 to determine which of the remote zones, which can be as many as 128 zones, are actually in the system. This scanning action is done by sequentially actuating status switch 22 by the operator and one of the two switches 19 and 20.

The identifying number of each active zone in the system is displayed in display 18 whenever an alarm event affects that zone. An alarm event occurs at a zone when the security sensor at that zone is actuated. Each sensor can be of any desired construction. For instance, the sensor of each zone can be an infrared detector, a magnetic switch, an ultrasonic motion detector, a smoke alarm, a floor sensor or a microwaver sensors. Other sensors can be used if desired. All system events displayed on display 18 are controlled by switches 19, 20 and 22 (FIG. 3) of control unit 12.

Actuating each switch 19 or 20 allows the operator to sequentially display the identifying numbers of all zones present in the system. When switch 19 is actuated, the display sequences identifying zone numbers in ascending order and when switch 20 is actuated, the display sequences down by descending identifying numbers of the zones. Switch 22 has three functions, namely, to acknowledge an alarm event, to secure a zone, or to access a zone. LED 52 mounted on push button 52 as shown in FIGS. 1 and 2 will flash and can be accompanied by a sound from sonic alert indicator 55 when an alarm event occurs. The LED will continue to flash and the sound alert indicator will continue to sound until the operator acknowledges the alarm event by actuating status switch 22.

When control unit 12 detects an alarm event at a remote zone, such as when the sensor at the zone sends a signal along bus 25 to control unit 12, CPU 36 receives the signal and causes specific data to be directed along data bus 40 to central portion 56 of display 18 so that the display will display the identifying number of the zone at which the alarm event occurs. Also, latch 54 is actuated to cause LED 52 to be energized and to flash. Sonic alert indicator 55 will also sound to warn of the alarm event. During an alarm event, the switches 19 and 20 are locked out so as to force the operator to acknowledge the alarm by actuating status switch 22. In the case of muliple alarms, the numbers of the various zones in alarm are displayed sequentially in central portion 56 of the display 18. Both the alarm and active words are flashed in portion 59 of display 18 when this occurs.

Once the alarm is acknowledged by actuating switch 22, the sonic alert is silenced and LED 52 is deactuated. When the alarm condition is corrected, such as by deactuating the actuated sensor, the word "active" at portion 59 of display 18 goes out and the zone can be secured by actuating the status switch 22. This action returns the zone to an access condition and the word "access" in portion 59 of display 18 will then be visible.

The word "active" on display 18 becomes visible whenever there is an alarm event at a zone and if the actuation of the sensor at the zone is continuous. The word "active" continues to be visible until the cause of that event has been corrected and the sensor is deactuated. If an alarm has been acknowledged and the active indicator appears in display 18, the zone having the alarm may be accessed by actuating status switch 22 one time. If the zone is in alarm, but the active indicator is not present, status switch 22 must be actuated two times, once to change the status of the zone from alarm to secure and a second time to change from secure to access. An alarmed or accessed zone may be secured by actuating status switch 22 when the identifying number of that zone appears in portion 56 of display 18.

If transponder 27 ceases to respond to the actuation of status switch 22, such as during monitoring of the zones of the transponder, this will indicate that the line to the transponder is defective. When this occurs, the sonic alert indicator 55 will sound and the identifying numbers of affected zones of that particular transponder 26 will be displayed sequentially on display 18 with their last known status. Then, the message "comfail" will appear in portion 57 of display 18. When the transponder 26 does eventually respond, the previous status of the zones will be restored.

Control unit 12 has a tamper annunciation portion and will detect a tamper alarm at junction box 23, if tampering does occur. In such a case, the sonic alert indicator 55 will sound and the word "tamper" in portion 57 of display 18 will become visible and will flash on the display. The alarm state is secured automatically when the tamper alarm is no longer detected. Tamper alarms cannot be manually secured or accessed. However, the tamper condition may be acknowledged to stop the sonic alert indicator 55 and allow the actuation of status switch 22.

If electrical power is removed from control unit 12, the sonic alert indicator will sound and the word "power" will be displayed at portion 57 of display 18. Operator acknowledgement is required to stop the sonic alert indicator and free the zone status switch 22 for use. When power is restored, the word "power" at portion 57 will go out.

The map displays 30 provide the operator with status information at a glance for each zone in the system. Each map display 30 is a modular unit which can contain 16 sets of three color-coded LED's 34. For each zone, a red LED indicates alarm, a yellow LED indicates access, and a green LED indicates secure. The map displays 30 can be rack mounted or can stand alone with control unit 12.

Figure 4:
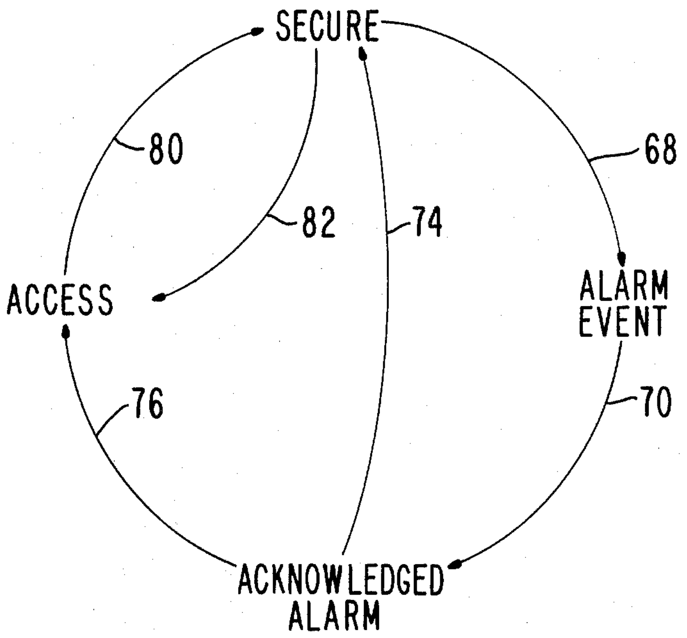
FIG. 4 is a graphic view of the sequence of steps in determining the status of a remote security zone and its sensor.

FIG. 4 shows in graphic form the sequence of events during an alarm event at a particular zone in which the status changes from secure to alarm status and then the return of the status of the zone to a secure condition, either directly or through an access event. Usually, each zone, before an alarm event, will be in a secure condition indicated at portion 59 on display 18 by the word "secure". When a sensor 31 at a particular zone is actuated to cause an alarm condition, the system changes from a secure status to an alarm event status indicated by the word "alarm" at portion 59 of display 18. Path 68 of FIG. 4 indicates the change from the secure status to the alarm event. If the sensor comprises an alarm event, there will be a sound made by sonic alert indicator 55. Also, LED 52 on pushbutton 28 (FIGS. 1 and 2) will flash to indicate the alarm event. If map displays 30 are used, the red LED 34 of the corresponding map display 30 will flash. If the sensor remains actuated, the word "active" is visible in portion 59 of display 18. If the sensor is actuated only for a short duration, the word "active" is not visible.

When the alarm event occurs, the operator will actuate switch 22 indicated by path 70 to acknowledge the alarm. When this occurs, the word "alarm" remains on the display 18, the sonic alert indicator 55 and LED 52 go off, and the red LED on the corresponding map display 30 will become a steady red. The operator can instruct a worker to go to the zone in alarm or can take other remedial action as required.

If the sensor at the zone in alarm is actuated only for a short duration, such as when a light beam is momentarily broken, actuation of switch 22 will return the zone to secure along path 74 of FIG. 4. At this point, the system is returned to its starting condition awaiting the next alarm event. However, if the actuation of the sensor is continuous, such as when a door is opened and remains open, switch 22 is actuated and the sequence follows a path 76 to a location on the chart in FIG. 4 represented by the word "access". When this condition is reached, the sonic alert indicator 55 is off and the yellow LED 34 of the corresponding map display 30 will be a steady yellow. Finally, the next actuation of status switch 22 will cause the sequence to follow along a path 80 of the chart in FIG. 4 back to the secure position and the system will remain in secure until the next alarm event. If, in, the secure condition, a zone is monitored by actuating switch 22, the sequence is along a path 82 back to access which will permit access or entry to the zone without causing an alarm event. The next actuation of switch 22 will return the zone to the secure condition in which the green LED 34 of the corresponding map display 30 will be steady green and the word "secure" will be visible at portion 59 of display 18.

In summary, the status of a zone displayed on control unit 12, the status of a particular sensor 31, and the status of the corresponding map display 30 will be as follows during a secure condition, followed by an alarm event:

| CONTROL UNIT STATUS | SENSOR STATUS | MAP DISPLAY |
|---|---|---|
| Secure<br>Active Alarm | Secure<br>Alarm | Green<br>Flashing Red |

After the first actuation (path 70 of FIG. 4) of status switch 22 following a sensor going into an alarm event, the sonic alert indicator 55 will be silenced and the LED 52 will be extinguished while the status of the zone displayed on the control unit 12, the status of the sensor, and the status of the corresponding map display will be steady red as follows:

| CONTROL UNIT STATUS | SENSOR STATUS | MAP DISPLAY |
|---|---|---|
| (Active) Alarm | (Alarm) Secure | Steady Red |

If the sensor is still actuated after the first actuation of switch 22, the word "active" will also be visible in portion 59 of display 18 and the sensor status will be in alarm rather than in secure.

At the second actuation of switch 22, the status of the zone displayed on control unit 12, the status of the sensor at the zone and the status of the map display will depend upon the conditions immediately before the second actuation of switch 22. If the status of the zone, sensor and map display are active alarm, alarm and steady red, respectively, then the second actuation of switch 22 causes the following conditions to occur:

| CONTROL UNIT STATUS | SENSOR STATUS | MAP DISPLAY |
|---|---|---|
| (Active) Access | (Alarm) Secure | Steady Yellow |

If the sensor remains actuated, the word active remains visible in portion 59 of display 18 along with the word "access". In such a case, the sensor will continue to be in alarm rather than in secure. If the sensor is only momentarily actuated, it will be secure when the sensor is deactuated. When the zone is in access, entry to the zone can be made by a person without causing an alarm event.

If the status of the zone, the sensor and map display are, before the second actuation of switch 22, alarm, secure and steady red, then the second actuation of switch 22 causes the following conditions to occur:

| CONTROL UNIT STATUS | SENSOR STATUS | MAP DISPLAY |
|---|---|---|
| Secure | Secure | Steady Green |

With this latter set of conditions, system 10 is ready for the next alarm event.

What is claimed is:

1. A security system for a plurality of remote security zones spaced from a central control location comprising: a central control unit adapted to be placed at said central control location; and actuatable sensor adapted to be placed at each of said zones, respectively; and means coupling the central control unit with the sensors when the sensors are at respective zones, each zone having an identifying number, said central control unit including a central processor, a display, a first switch for actuating the display under the control of the central processor to cause the identifying numbers of the zones to be sequentially displayed on the display, a second switch for actuating the display under the control of said central processor to cause the status of a zone to be displayed on the display when the identifying number of the zone is displayed on the display, the status of each zone being changeable as a function of the actuation and deactuation of the respective sensor, whereby the status of a zone can change from a first status condition to a second status condition when the respective sensor is actuated, said second switch being actuatable under the control of the central processor to return the status of a zone displayed on said display to the first status condition when the status of the zone is in the second status condition when the sensor is deactuated after being actuated, said central processor being operable to display a symbol on the display representing an active actuation condition of a sensor when the sensor remains actuated after being actuated, the actuation of the second switch being operable to cause the central processor to display a third status condition of a zone before the status of the zone is returned to the first status condition if the sensor at the zone remains actuated after being actuated.

2. A security system as set forth in claim 1, wherein the central processor operates to permit a zone identifying number to be entered into the display without causing a change in the status of the zone from the first status condition to the second status condition if the second switch is actuated when the status of a zone is in the first status condition before the zone is entered.

3. A security system as set forth in claim 1, wherein is included a map display adjacent to the central control unit, said map display having three light sources for each zone, respectively, one of the light sources representing a first status condition of the respective zone, the second light suorce representing a second status condition of the zone, and the third light source representing a third status condition of the zone.

4. A security system for a plurality of remote security zones spaced from a central control location comprising: a central control unit adapted to be placed at said central control location; an actuatable sensor adapted to be placed at each of said zones, respectively; transponder means coupling the sensors with the central control unit when the sensors are at respective zones, each sensor having a secure condition and an alarm condition, each sensor being in an alarm condition after the sensor has been actuated and before it is deactuated, each zone having an identifying number associated with it, said central control unit including a central processor, a display, a pair of first switches for actuating the display under the control of the central processor to cause the identifying number of the zones to be sequentially displayed on the display, one of the first switches being operable to sequence the identifying numbers in a forward direction and the other first switch being operable to sequence the identifying numbers in a reverse direction, said central control unit further including a second, status switch for actuating the display under the control of the central processor unit to cause the status of a zone to be displayed on the display when the identifying number of the zone is displayed on the display, each zone having a secure status, an alarm status and an access status, the status of each zone being changeable from the secure status to the alarm status when a sensor at the zone is actuated, the central processor being operable to change the status of a zone displayed on the display from the alarm status to the access status when the second switch is actuated and when the actuated sensor remains actuated, the central processor being operable to change the status of a zone displayed on the display from the alarm status to the secure status when the second switch is actuated and when the sensor is thereafter deactuated, said central processor being further operable to change the status of a zone displayed on the display from the access status to the secure status when the second switch is actuated as the zone is in the access status, the central processor being operable to change the status of a zone displayed on the display from the secure status to the access status when the second switch is actuated and as the sensor of the zone remains deactuated, whereby entry to the corresponding zone will be permitted without causing the zone to be placed in an alarm status.

5. A method of monitoring a plurality of remote security zones each being capable of having a secure status, an alarm status and an access status comprising: providing an actuatable sensor at each zone, respectively; displaying the status of each zone on a visual display at a central control location; changing the status of a zone displayed on the display from a secure status indication to an alarm status indication when the sensor at the zone is actuated; providing an observable indication of the alarm status indication; returning the status of a zone corresponding to an actuated sensor to a secure status after the alarm status has been displayed on the display and the actuated sensor has been deactuated; changing the status of a zone from an alarm status to an access status when a corresponding sensor remains actuated after being actuated; and causing the change of the status of a zone from an access status to a secure status after said changing step when the corresponding sensor has been deactuated, said returning, changing and causing steps being effected by a number of actuations of a single electrical switch.

6. A method as set forth in claim 5, wherein each zone has an identifying number, and wherein is included the step of selectively displaying the identifying number of each of said zones at said central control location.

7. A method as set forth in claim 5, wherein each zone has an identifying number, and including the step of displaying the identifying number of a zone at said central control location when the sensor corresponding to the zone is actuated.

* * * * *